Jan. 21, 1969     S. H. ROBINSON     3,423,548
TIRE UNDERINFLATION WARNING DEVICE
Filed April 19, 1967                    Sheet 1 of 2

INVENTOR.
SIDNEY H. ROBINSON
BY
William R. Piper
ATTORNEY

United States Patent Office 3,423,548
Patented Jan. 21, 1969

3,423,548
TIRE UNDERINFLATION WARNING DEVICE
Sidney H. Robinson, Hayward, Calif.
(6472 MacArthur Blvd., Oakland, Calif. 94505)
Filed Apr. 19, 1967, Ser. No. 632,079
U.S. Cl. 200—61.22
Int. Cl. H01h 35/00
7 Claims

ABSTRACT OF THE DISCLOSURE

The tire underinflation warning device will indicate automatically when the air pressure in any one of the vehicle tires drops below a predetermined point. The device will not interfere with the changing of the tires and rims on any one of the vehicle wheels.

BACKGROUND OF THE INVENTION

Field of the invention

The device can be applied to tires that are used on all types of vehicles. The warning signal for the device is preferably placed on the instrument panel of the vehicle and a novel electrical system interconnects each vehicle tire with the warning signal so that the latter is energized when any of the tires becomes underinflated.

Description of the prior art

Patents have been granted on devices where air tubes connect the tire valves to an electric switch actuating mechanism. The closing of the switch is accomplished when the air pressure in a tire drops below a safe point and an electric circuit will actuate the warning signal.

SUMMARY OF THE INVENTION

This invention is an improvement over the form of the device disclosed in my copending application on a tire pressure warning device, filed Feb. 7, 1967, Ser. No. 614,468. In that device an insulated wire extends from an air pressure sensing unit that is carried by the tire rim to the outer side of the rim where the wire is connected to a second wire that extends through the flange of the vehicle axle. An insulated collector ring is supported by the axle flange and the second wire is connected to it. The collector ring is in electrical connection with the remainder of the tire pressure warning device.

In my copending patent application device, it is necessary to free the first wire from the second wire before the tire and rim can be removed from the vehicle wheel. Also when remounting the tire rim on the wheel, the rim must be rotated with respect to the wheel so as to align the exposed end of the second wire with the free end of the first wire and then the wheel studs can connect the rim to the wheel.

An object of the present invention is to do away with exposing any portion of the first wire at the front side of the wheel. Moreover the tire and rim may be removed from the wheel without the necessity of first manually disconnecting the first wire from the second wire. Also the tire and rim may be remounted on the vehicle wheel without the requirement of first aligning the first wire with the second one. I provide as many second wires as there are wheel studs and these are connected to terminals that are correctly positioned on the wheel so that regardless of how the tire rim is mounted on the wheel, the terminal that is connected to the first wire will make an electrical connection with one of the terminals connected to one of the second wires.

I removably mount a collector ring on the vehicle axle rather than on the axle flange and I insulate the ring from the axle. All of the second wires are electrically connected to the ring which in turn is in electrical connection with the tire pressure warning system. Each vehicle wheel and its tire and rim are provided with the same elements that have already been mentioned for my improved device. Wires from the collector rings of each wheel are in electrical connection with the warning signal on the instrument panel of the vehicle and the driver will be warned by the automatic energizing of the signal as soon as any tire air pressure drops too low.

The device is simple in construction and can readily be applied to tire rims and wheels. Each tire rim covers the wire on the rim and no part of the warning system will be viewable from a point exterior of the vehicle. The device will have a long operative life.

DESCRIPTION OF THE PREFERRED EMBODIMENT

Figure 1:
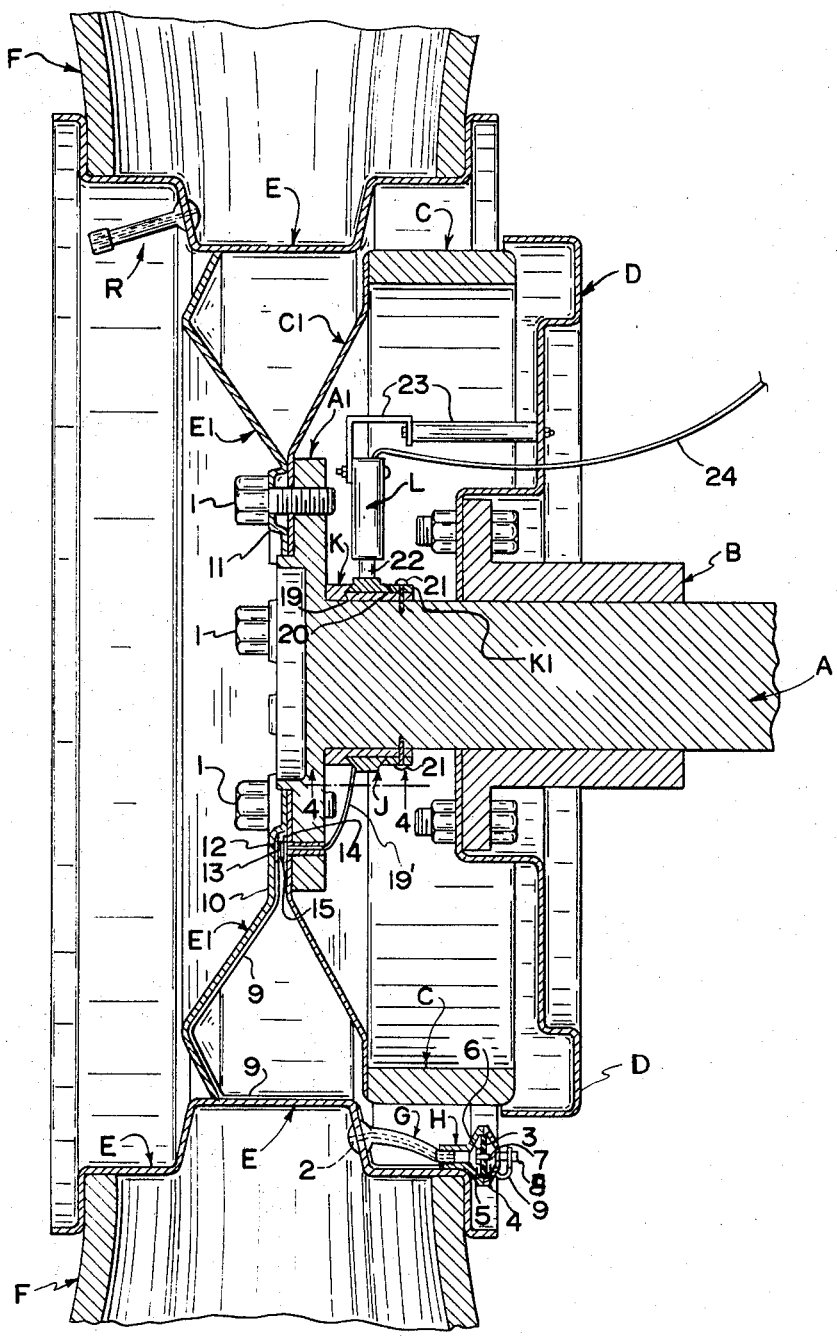
FIGURE 1 is a longitudinal section through a vehicle wheel, tire and rim, and shows my device operatively applied thereto. The section is taken substantially along the line 1—1 of FIGURE 2.

In carrying out my invention, I illustrate in FIGURE 1, a vehicle axle A having an integral annular flange A1. The axle is rotatably supported in an axle bearing B. A brake drum C has a disc portion supported in an axle bearing B. The brake drum C has a disc portion C1 that connects it to the axle flange A1. A dust cover D is supported by the bearing B and protects the brake drum C. A tire rim E has a tubeless tire F mounted thereon and a disc portion E1 for the tire rim is removably connected to the axle flange A1 by the stud bolts 1. A plastic or rubber valve stem G is connected to the tire rim E and it has an air passage 2 that communicates with the interior of the tubeless tire F.

An air pressure switch, indicated generally at H, has a hollow neck portion that is internally threaded to receive the externally threaded end of the valve stem G. The air pressure switch H has an enlarged portion in which a diaphragm 3 is mounted. The diaphragm divides the interior of the enlarged portion into two compartments 4 and 5. An electric current conducting button 6 is mounted at the center of the diaphragm 3 and a compression spring 7 is mounted in the compartment 4 and yieldingly urges the button 6 to the left in FIGURE 1. The diaphragm 3 will be flexed by this movement and will permit the metal button 6 to make contact with the metal casing of the air pressure switch H unless there is sufficient air pressure in the tubeless tire F to cause the air pressure in the compartment 5 to offset the spring pressure and prevent it. The spring 7 also acts as a conductor of an electric current from a terminal 8, mounted on the casing H, but insulated therefrom to the metal button 6 for a purpose hereinafter described.

Figure 2:
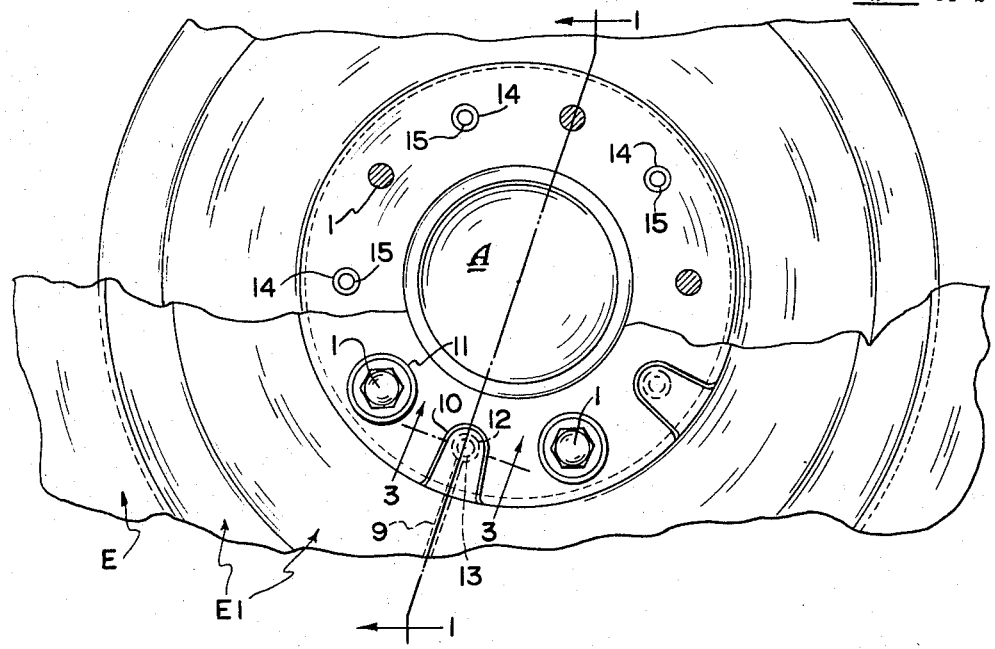
FIGURE 2 is a front elevation of a portion of the tire and rim shown mounted on the vehicle wheel. The same figure shows in elevation a portion of the vehicle wheel that is not covered by the tire and rim.
Figure 3:
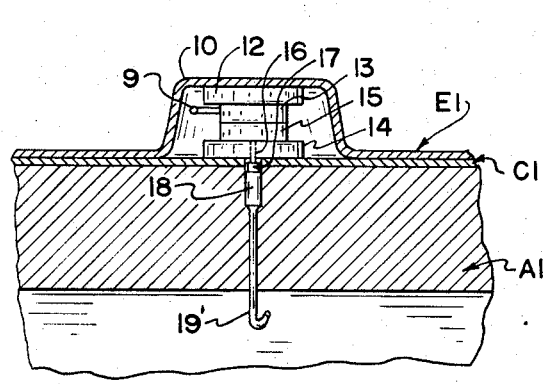
FIGURE 3 is an enlarged sectional view taken along the line 3—3 of FIGURE 2 and illustrates how the terminal for the wire that leads to the air pressure sensing unit is carried by the tire rim and is hidden from view. The figure further shows another terminal carried by the brake drum that in turn is supported by the axle flange. The second terminal contacts with the first terminal and an electrical coupling connects the second terminal to another insulated wire that extends through the axle flange.

FIGURE 1 shows the air pressure switch H as being secured to the tire rim E by the valve stem G. The air pressure switch H is in electrical connection by soldering the switch casing to the rim E. An insulated wire 9 leads from the terminal 8 and is attached to the inner surface of the tire rim E and to the inner surface of the supporting disc portion E1. Referring to FIGURE 2 as well as FIGURE 1, it will be seen that the disc portion E1 of the tire rim E has raised portions 10 that are positioned between other circular raised portions 11, these latter raised portions 11 having openings for receiving the stud bolts 1. The raised portions 10 extend outwardly in a radial direction and provide a channel for receiving the insulated wire 9. FIGURE 1 is a radial section through one of the raised portions 10 and shows how it is channel-shaped. FIGURE 3 is an enlarged transverse section through the raised portion 10 of the disc E1 that supports the tire rim E.

In the enlarged section of FIGURE 3, the raised portion 10 is shown provided with an insulating disc 12 on its inner surface and the disc supports a contact terminal 13. The wire 9 is electrically connected to the terminal 13. The disc E1 carries only one wire 9 and one contact terminal 13 although the disc is provided with as many raised portions 10 as there are stud bolts 1. FIGURE 2 shows five stud bolts 1 with five raised portions 10 that are placed between the stud bolts.

The disc portion C1 for the brake drum C has a plurality of insulating discs 14, and each disc supports a contact terminal 15, see FIGURES 1, 2 and 3. The contact terminals 15 are so arranged on the disc portion C1 that one of the terminals will register with and contact the single contact terminal 13 when the tire rim disc E1 is mounted on the disc C1. In other words the usual vehicle wheel is provided with five stud bolts 1 that are spaced equal distances from each other. The tire disc E1 can be mounted on the wheel in any one of five different positions. The five contact terminals 15 are so arranged on the disc C1, that regardless of how the tire rim E with its disc E1 is mounted on the wheel in any one of its five positions, one of the contact terminals 15 will register with and form an electrical connection with the contact terminal 13 when the tire rim is secured in place by the stud bolts 1. In this respect, the present invention is an improvement over my copending application, Ser. No. 614,468.

Figure 4:
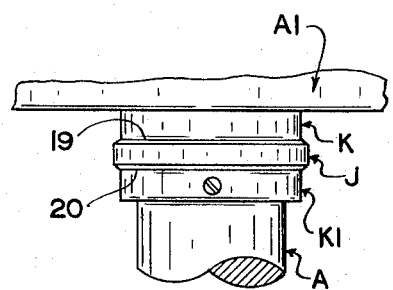
FIGURE 4 shows the vehicle axle in elevation and provided with a collector ring that is insulated therefrom. It is taken along the section line 4—4 of FIGURE 1.

Each contact terminal 15, see FIGURE 3, has an insulated wire 16 leading from it and passing through the insulating disc 14. The wire 16 is provided with a coupling plug 17 that connects with a metal cup 18 which is received in the axle flange A1 but is insulated therefrom. An insulated wire 19 leads from the metal cup or socket to a collector ring J, see FIGURES 1 and 4, that is mounted on the axle A, but is insulated therefrom. FIGURE 1 shows the collector ring J in section and as being provided with annular side flanges 19 and 20 that are wedge-shaped in cross section. An insulating sleeve K is mounted on the axle A and is placed between the collector ring J and the axle so as to insulate the collector ring therefrom. The sleeve K has a bevelled groove for receiving the wedge-shaped or bevelled flange 19 of the collector ring J. An insulating ring K1 is mounted on the insulating sleeve K and it has a bevelled inner annular edge that cooperates with the wedge-shaped edge 20 of the collector ring J, for holding the latter against lateral displacement in FIGURE 1. Screws 21, or other suitable fastening means, see FIGURE 1, extend through the insulating ring K1 and the insulating sleeve K for securing the collector ring, insulating sleeve and insulating ring to the axle A.

There are five wires 19' connected to the collector ring J. This means that regardless of how the tire rim and its disc E1 are mounted on the vehicle wheel, the contact terminal 13 will be in electrical connection with the collector ring J. I mount a brush holder L in a position, see FIGURE 1, so that its spring-biased brush 22 will be held in yielding electrical contact with the collector ring J at all times. A supporting bracket assembly 23, connects the brush holder L to the dust cover D for the wheel.

Figure 5:
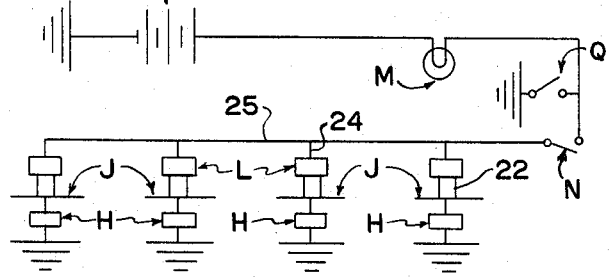
FIGURE 5 is a wire diagram of the warning system, parts of the device being illustrated schematically.

Each vehicle wheel is provided with the electrical parts that have been described for one of the wheels. In FIGURE 5, I show a wiring diagram and illustrate schematically how the electrical parts of each wheel are placed in electrical connection with a warning signal light M should any one of the tires become underinflated. The air pressure switches H have one of their terminals grounded and the wires 9 and 19' lead from these switches to the collector rings J, shown by the single lines in the figure. The brush holders L have their brushes 22 in contact with the collector ring J. Wires 24 lead from the brush holders to a common wire 25 and the latter is connected to the warning light M, when the ignition switch N, is closed. The warning light is in electrical connection with a source of electric current, such as the battery P, and one terminal of the battery is grounded so as to complete the electric circuit. A separate switch Q may be closed to test the warning light to see that it has not burned out.

OPERATION

From the foregoing description of the various parts of the device, the operation thereof may be readily understood. When any one of the tires becomes underinflated, the spring 7 will overcome the air pressure in the compartment 5 and will flex the diaphragm 3 for moving the metal terminal 6 into contact with the metal housing of the air pressure switch H. As soon as this occurs, an electric circuit will be closed through the spring 7, the terminal 8, wire 9 to the contact terminal 13. From here the current will flow through the associate contact terminal 15, wire 19' and to the collector ring J. The current then flows through the brush 22, the wire 24 and to the common wire 25 and to the warning light M when the switch N is closed. The illumination of the warning light on the instrument panel, not shown, of the vehicle, indicates to the driver that one of the tires is underinflated.

FIGURE 1 shows the air pressure switch H being disposed diametrically opposite to the tire valve R so that vehicle wheel will be in proper balance.

I claim:
1. In combination:
  (a) a vehicle wheel;
  (b) a tire rim and integral disc removably mounted on said wheel;
  (c) stud bolts for connecting the rim to the wheel and being radially spaced from the wheel axis and spaced equal distances apart from each other;
  (d) electrical contact terminals placed on said wheel and between said stud bolts and being equal in number thereto; and
  (e) an electrical contact terminal carried on the inner surface of said tire rim disc and being brought into electrical connection with one of said first-mentioned contact terminals when said tire rim and integral disc are connected to said wheel by said stud bolts.

2. The combination as set forth in claim 1: and in which
  (a) an air pressure sensitive switch is mounted on said tire rim and on the inner side of the tire rim disc so that the disc conceals the switch when looking at the outer side of the tire rim disc; and
  (b) electrical connections between said switch and said contact terminal disposed on the inner surface of said tire rim disc, said electrical connections being disposed on the inner surface of said disc.

3. The combination as set forth in claim 1: and in which
  (a) an axle is provided for said wheel;
  (b) a collector ring mounted on said axle and insulated therefrom; and (c) electrical connections between each of the contact terminals on said wheel and said collector ring.

4. The combination as set forth in claim 2: and in which
   (a) an axle is provided for said wheel;
   (b) a collector ring mounted on said axle and insulated therefrom; and
   (c) electrical connections between each of the contact terminals on said wheel and said collector ring.

5. The combination as set forth in claim 4: and in which
   (a) the electrical contact terminals on said wheel are insulated from the wheel; and
   (b) the electrical contact terminal on said tire rim disc is insulated therefrom.

6. The combination as set forth in claim 3; and in which the insulation for the collector ring comprises:
   (a) an insulating sleeve disposed between said axle and said collector ring;
   (b) said collector ring having annular flanges that are bevelled in cross section;
   (c) said insulating sleeve having a bevelled annular groove for receiving the adjacent bevelled collector ring flange; and
   (d) an insulating ring mounted on said insulating sleeve and having a bevelled edge for contacting with the other bevelled collector ring flange.

7. The combination as set forth in claim 3; and in which the electrical connections between each of the contact terminals on said wheel and said collector ring, comprises:
   (a) mounting each of said wheel contact terminals on a brake drum disc that is removably secured to said wheel;
   (b) an insulated wire extending from each wheel contact terminal to said collector ring; and
   (c) an electrical coupling between each of said wires and its wheel contact terminal to permit the removal of said brake drum disc from the wheel, the couplings being disconnected for this purpose.

References Cited

UNITED STATES PATENTS

| | | | |
|---|---|---|---|
| 2,846,664 | 8/1958 | Amundsen et al. | 340—58 |
| 3,222,641 | 12/1965 | Jacobus | 340—58 |
| 3,241,112 | 3/1966 | Linkmeyer | 340—58 |
| 3,249,916 | 5/1966 | Quinn | 340—58 |

ROBERT K. SCHAEFER, *Primary Examiner.*

HERMAN O. JONES, *Assistant Examiner.*